United States Patent [19]

Katayama

[11] Patent Number: 4,981,403
[45] Date of Patent: Jan. 1, 1991

[54] SPEED-UP SPINDLE UNIT
[75] Inventor: Eiichi Katayama, Osaka, Japan
[73] Assignees: Showa Seiki Kabushiki Kaisha; Koyo Seiko Co., Ltd., both of Osaka, Japan
[21] Appl. No.: 369,757
[22] Filed: Jun. 23, 1989
[30] Foreign Application Priority Data Jun. 28, 1988 [JP] Japan ................................ 63-160336

[51] Int. Cl.⁵ .............................................. B23C 9/00
[52] U.S. Cl. .................................... 409/136; 409/137; 409/144; 408/126; 408/61; 475/183
[58] Field of Search ............... 409/144, 230, 135, 231, 409/136, 137; 408/126, 125, 124, 61; 384/311, 313, 900, 557; 475/183; 173/29; 51/168, 170 PT, 170 T

[56] References Cited
U.S. PATENT DOCUMENTS

| 2,199,379 | 5/1940 | Tornebohm | 409/144 |
| 2,521,585 | 9/1950 | Kurtz et al. | 408/124 |
| 2,815,685 | 12/1957 | Parrett | 475/183 |
| 2,915,949 | 12/1959 | Novak | 409/144 X |
| 4,082,475 | 4/1978 | Kuder | 408/126 X |
| 4,296,648 | 10/1981 | Okano et al. | 475/183 |
| 4,652,189 | 3/1984 | Mizoguchi | 408/239 R X |

FOREIGN PATENT DOCUMENTS 645778 2/1979 U.S.S.R. .............................. 409/144

Primary Examiner—Z. R. Bilinsky
Assistant Examiner—R. Shultz
Attorney, Agent, or Firm—Antonelli, Terry, Stout and Kraus

[57] ABSTRACT

A speed-up spindle unit including a non-rotative housing having a fixed ring, a sun roller secured to a high speed spindle rotatably carried in the housing and a plurality of planetary rollers rotatably carried in such a manner as to be in contact with the fixed ring at one peripheral end and the sun roller at the opposite peripheral end so that the planetary rollers individually rotate about their own axes while they revolve about the sun roller, thereby transmitting a torque from the planetary rollers to the high speed spindle through the sun roller.

7 Claims, 2 Drawing Sheets

SPEED-UP SPINDLE UNIT

BACKGROUND OF THE INVENTION

The present invention relates to a speed-up spindle unit for connection to main shafts of machine tools, and, more particularly, to a speed-up spindle unit suited for rotating a small diameter cutting tool at high speeds.

Various types of speed-up spindle units have been proposed and, for example a planetary gear mechanism is connected between an input shaft connected to the main shaft of the machine, and a high speed spindle (an output shaft) having a chuck is attached to a forward end of the spindle. The planetary gear mechanism increases the speed of rotation of the input shaft so that the high speed spindle rotates at high speeds.

One of the disadvantages of the speed-up spindle unit having a planetary gear mechanism is relatively low rigidity which is likely to cause vibrations in the working tools. Another disadvantage is that its capacity for carrying loads is small.

Accordingly, an object of the present invention is to provide a speed-up spindle unit having a high rigidity structure.

Another object of the present invention is to provide a speed-up spindle unit having a torque transmitting stability.

SUMMARY OF THE INVENTION

In accordance with the present invention, a speed-up spindle unit for connection to machine tools is provided, with the spindle unit including a cylindrical housing having means for preventing the housing from rotating relative to the machine tool, and a cylindrical carrier having a central bore extending in an axial direction from a forward end toward a rear end and connected to an input shaft at a rear end thereof. A ring is fixed on the inner peripheral surface of the housing so that the ring is positioned coaxially with respect to the cylindrical carrier, and a high speed spindle is connected to a tool holder at a forward end and to a sun roller at a rearward end thereof. A plurality of lateral bores are circumferentially arranged in the carrier in communication with the central bore, and planetary rollers are rotatably carried in the respective lateral bores in such a manner so as to be in contact with the fixed ring at one peripheral end and at the sun roller at the opposite peripheral end so that the planetary rollers individually rotate about their own axis while they revolve about the sun roller thereby constituting a traction mechanism whereby an increased speed output is obtained from the sun roller in response to the input of the carrier. A cooling jacket is provided and disposed in the housing for cooling the fixed ring subjected to heat generated by friction.

The cooling jacket is preferably connected to an outlet port which is open toward the tool holder so that the discharged coolant can cool and lubricate the tool while the tool is in operation. Preferably the fixed ring is provided with a ring-shaped groove to store a lubricant.

Thus, when the carrier is connected to the main shaft of a machine tool and is rotated, the planetary rollers individually rotate about their own axes while they revolve about the sun roller. Because of the fit contact between the planetary rollers and the sun roller, a torque is exerted on the sun roller at each contact point therebetween. The lubricant films covering the contact points protect the sun roller and the planetary rollers against seizure. The cooling jacket reduces a temperature rise possibly caused by the rotation of the high speed spindle.

The above and other objects, features, and advantages of the present invention will become more apparent from the following description when taken in connection with the accompanying drawings which show, for the purpose of illustration only, one embodiment in accordance with the present invention.

DETAILED DESCRIPTION OF THE PREFERRED EMBODIMENT

An speed-up spindle unit of the present invention can be applied to various uses. The illustrated embodiment is a case where the unit is applied to an automatic tool changer (ATC).

Figure 1:
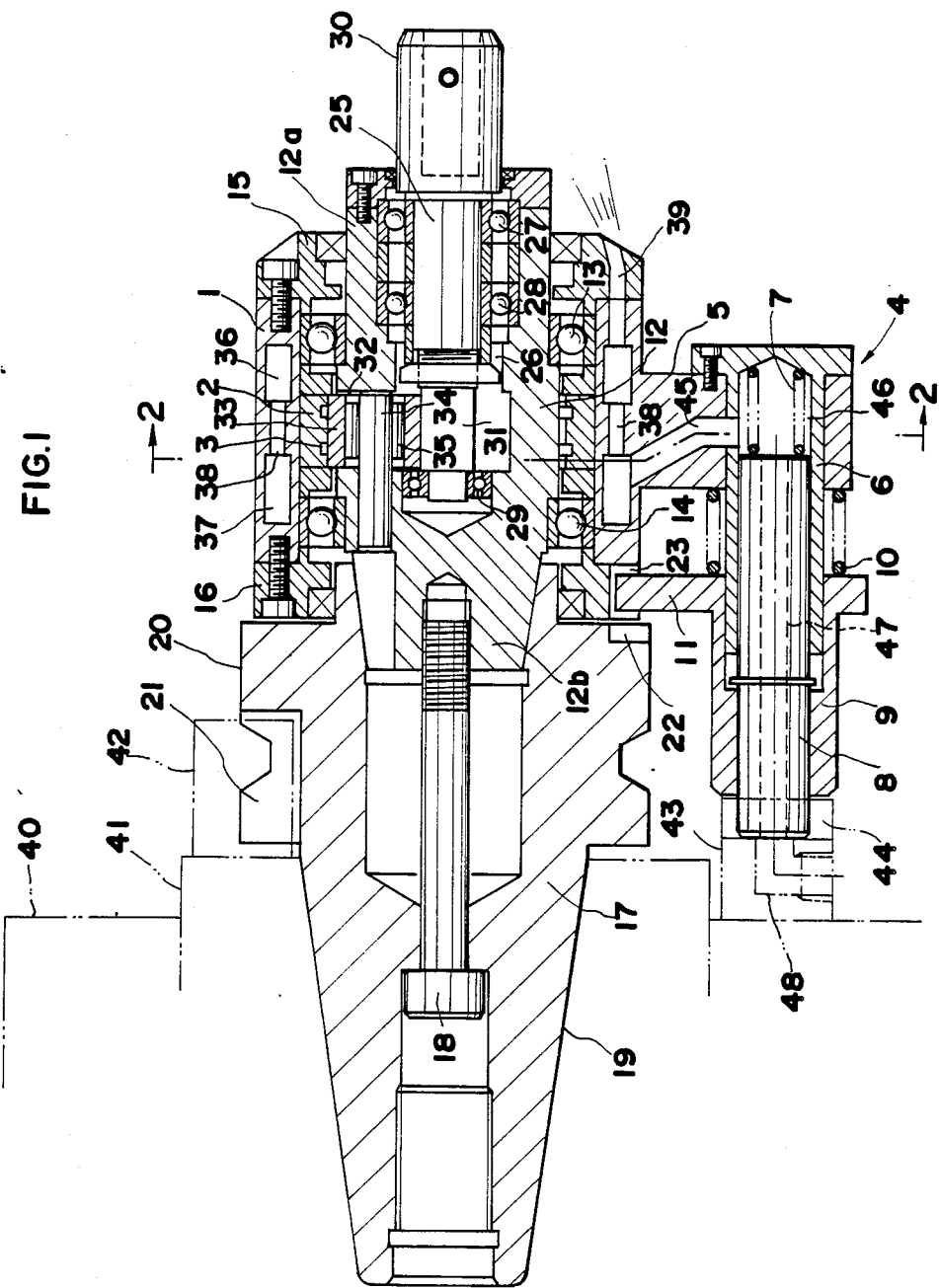
FIG. 1 is a longitudinal cross-sectional view of a speed-up spindle unit according to the present invention.

Referring to FIG. 1, a cylindrical housing 1 has a fixed ring 2 on a middle portion of an inner periphery thereof, with the fixed ring 2 having a ring-shaped groove 3 for storing a lubricant on an inner peripheral surface thereof.

The housing 1 is provided with a stop unit 4 for preventing the housing 1 from rotation with respect to a machine 40. The stop unit 4 includes an arm 5 radially projecting through the housing 1, a guide sleeve 6 secured to the arm 5 in parallel with the central axis of the housing 1, a stop pin 8 slidably mounted through the guide sleeve 6 in such a manner so as to be normally biased outward by a first spring 7, and a slidable cylinder 9 housing the stop pin 8, the slidable cylinder 9 being also biased outward by a second spring 10. The slidable cylinder 9 has a radially projecting engager 11 at its rearward end, which is designed to position an input shaft 17 at an exact position with respect to the housing 1 as will be described below.

A cylindrical carrier 12 is disposed concentrically of the fixed ring 2 of the housing 1, with the cylindrical carrier 12 being rotatably supported through ball bearings 13 and 14. The carrier 12 has a forward end 12a and a rearward end 12b which respectively project through covers 15 and 16 covering the respective ends of the housing 1. The input shaft 17 having a tapered shank portion 19 is fixed to the rearward end 12b of the carrier 12 by means of a bolt 18.

The input shaft 17 has a flange 20 at a forward end thereof with which a holding arm of the automatic tool changer is engaged. The flange 20 has a key groove 21 along a periphery thereof to receive a drive key 42 of a main shaft 41 of the machine 40, and another key groove 22 engageable with the engager 11. Normally, the engager 11 fits in the key groove 22 whereby the input shaft 17 is positioned appropriately against the housing 1. The cover 16 has a recess 23 opposite the groove 22. When the main shaft 41 of the machine 40 and the tapered shank 19 of the input shaft 17 are joined as shown in FIG. 1, the stop pin 8 fits in a recess 44 in a block 43 of the machine 40, thereby enabling the housing 1 to stay stationary against the machine 40. The slidable cylinder 9 comes into abutment with the forward end of the block 43, and moves toward the arm 5 against the spring 10. The backward movement of the cylinder 9 causes the engager 11 thereof to separate from the groove 22 and fit in the recess 23. As a result, the input shaft 17 is ready to rotate independently of the housing 1. The rotation of the main shaft 41 is transmitted to the carrier 12 through the input shaft 17.

Figure 2:
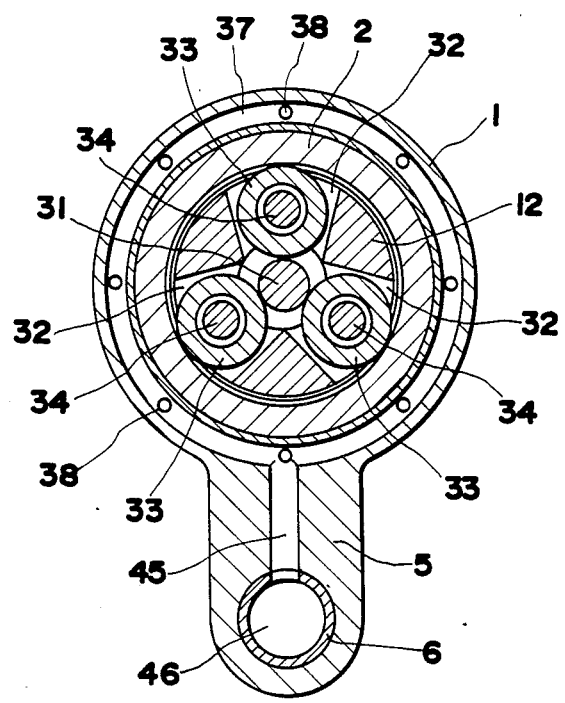
FIG. 2 is a cross-sectional view taken along the line 2—2 in FIG. 1.

A high speed spindle 25 is rotatably carried in a bore 26 axially produced in the carrier 12 through ball bearings 27, 28 and 29. The balls used in the bearings 13, 14 and 27 to 29 can be made of steel or ceramics such as silicone-nitride base ceramics. The ceramic ball bearings are advantageous in that the rigidity for supporting the spindle is enhanced as compared with the conventional steel ball bearings, thereby preventing the housing 1 from becoming deformed under a load thereby enabling an increased capacity for carrying loads. Another advantage is that the ceramics ball bearings prevent the lubricant film thereon from deteriorating due to a temperature rise caused by friction. This is of particular advantage for the bearings 27 and 28 which rotate at a high speed. The use of ceramics is as useful as the employment of the cooling jackets to prevent the lubricant from deteriorating due to a temperature rise. In addition, the ceramics ball bearings are protected against seizure owing to a temperature rise resulting from the high speed rotation. The high speed spindle 25 is connected to a tool holder 30 at a forward end thereof, and to a sun roller 31 at a rearward end thereof. As clearly shown in FIG. 2, the carrier 12 has lateral bores 32 provided circumferentially at angular intervals and, in the illustrated embodiment, at an angular interval of 120°. The planetary rollers 33 are rotatably accommodated in the lateral bores 32.

The planetary rollers 33 carried in the respective lateral bores 32 keep contact with the fixed ring 2 and the sun roller 31 thereby resulting in a traction drive mechanism. The planetary rollers 33 are individually carried on pins 34 through needle roller bearings 35 accommodated in axially extending bores provided in the respective planetary rollers 33. Because of the frictional contact of the planetary rollers 33 with the ring 2 and the sun roller 31, a drive is transmitted to the sun roller 31 through the planetary rollers 33. The fixed ring 2 is in interference fit with respect to the housing 1, thereby subjecting the fixed ring 2 to a concentric contraction. This arrangement avoids variations in the fit of the planetary rollers 33.

The housing 1 is provided with ring-shaped jackets 36 and 37 at a forward side and at a rearward side, respectively, in which a coolant is circulated. The jackets 36 and 37 are connected to each other through bores 38 arranged in parallel at intervals. The jacket 36 is preferably connected to an outlet port 39 which is open in the front of the cover 15. The jacket 36 is preferably connected to an outlet port 39 which is open in the front of the cover 15. The jacket 37 is connected to a space 46 in the guide sleeve 6 through a branch pass 45 and also to a space 47 in the stop pin 8. While the speed-up spindle unit is in use, the space 47 is brought into communication with a coolant supply port 48 provided in the block 43. Thus, a coolant is introduced into the jacket 37 through the spaces 47 and 46, and the secondary pass 45, flowing into the jacket 36 through the bores 38, and is discharged through the outlet port 39. The discharged coolant cools the tool (not shown) in operation.

When the carrier 12 rotates in accordance with the rotation of the main shaft 41, the three planetary rollers 33 rotate about their own axes while revolving about the sun roller 31. The torque is transmitted from the planetary rollers 33 to the sun roller 31 through an oil film formed therebetween. In this way the high speed spindle 25 rotates in accordance with the rotation of the sun roller 31, thereby enabling the tool (not shown) held by the tool holder 30 to rotate.

As the rotating speed of the spindle 25 increases, the fixed ring 2 is subjected to frictional heat but the coolant in the jackets 36 and 37 prevents temperature rises. Thus, the fixed ring 2 is protected against expansion or elongation due to heat, which otherwise would restrict the allowance for tightening the planetary rollers 33.

What is claimed is:

1. A speed-up spindle unit for connection to machine tools, the spindle unit comprising:
   a cylindrical housing having means for preventing the cylindrical housing from rotating relative to a machine tool;
   a cylindrical carrier having a central bore extending in an axial direction from a forward end thereof toward a rear end thereof and connected to an input shaft at the rear end;
   a ring fixed on an inner peripheral surface of the cylindrical housing so that the ring is positioned coaxially with respect to the cylindrical carrier;
   a high-speed spindle connected to a tool holder at a forward end thereof and to a sun roller bearing at a rear end thereof;
   means mounting said high speed spindle for rotation in said carrier;
   a plurality of lateral bores circumferentially arranged in the cylindrical carrier in communication with the central bore;
   a plurality of planetary roller bearing means respectively rotatably accommodated in the respective lateral bores for forming a traction drive means, said planetary roller bearing means being disposed in contact with the fixed ring at one peripheral end thereof and in contact with the sun roller bearing at the opposite peripheral end thereof so as to enable the planetary roller bearing means to be individually rotatable about their own axes while the planetary roller bearing means revolve about the sun roller bearing, wherein an increased speed output is obtained from the sun roller bearing in response to an input to the cylindrical carrier; and
   coolant means for cooling the fixed ring subjected to heat generated by friction including a cooling jacket means disposed in the housing at least in an area of the fixed ring.

2. A speed-up spindle unit according to claim 1, wherein the cooling jacket means includes a plurality of annular cooling jackets.

3. A speed-up spindle unit according to claim 2, wherein the coolant means includes an outlet port means communicating with the cooling jacket means and opening toward the tool holder for discharging coolant from the cooling jacket means to cool and lubricate the machine tool.

4. A speed-up spindle unit according to claim 3, wherein the fixed ring includes ring-shaped groove means on an inner peripheral surface thereof for storing a lubricant.

5. A speed-up spindle unit according to claim 1, wherein the coolant means includes an outlet port means communicating with the cooling jacket means and opening toward the tool holder for discharging coolant from the cooling jacket means to cool and lubricate the machine tool.

6. A speed-up spindle unit according to claim 1, wherein the fixed ring includes ring-shaped groove means on an inner peripheral surface thereof for storing lubricant.

7. A speed-up spindle unit according to one of claims 1, 2, 3, 4, 5 or 6, wherein each of the plurality of planetary roller bearing means includes an axially extending bore means, and wherein needle roller bearing means are accommodated in the bore means of the respective planetary roller bearing means for individually rotatably supporting said planetary roller means.

* * * * *